United States Patent [19]

Throop et al.

[11] 4,165,450

[45] Aug. 21, 1979

[54] TELEPHONE SIGNALLING TEST SYSTEM

[75] Inventors: C. Terry Throop, Concord; Richard E. Moffett, Portsmouth; John R. Hemmert, Nashua; Robert E. Sawyer, Jr., Epsom, all of N.H.

[73] Assignee: Northern Telecom Inc., Ottawa, Canada

[21] Appl. No.: 906,914

[22] Filed: May 17, 1978

[51] Int. Cl.² .......................................... H04M 3/22
[52] U.S. Cl. .......................................... 179/175.2 C
[58] Field of Search ................ 179/175.2 C, 175.3 R, 179/1 MN, 175.2 R, 175.2 A

[56] References Cited

U.S. PATENT DOCUMENTS

| 3,917,915 | 11/1975 | Karras | 179/175.2 C |
| 4,117,278 | 9/1978 | Ehrlich et al. | 179/175.2 C |

Primary Examiner—Thomas A. Robinson
Attorney, Agent, or Firm—Spencer & Kaye

[57] ABSTRACT

Telephone signalling test apparatus is provided for monitoring telephone lines under live traffic conditions. The apparatus is modular with a main frame having a line interface and central control and storage unit, as well as numerical display.

11 Claims, 4 Drawing Figures

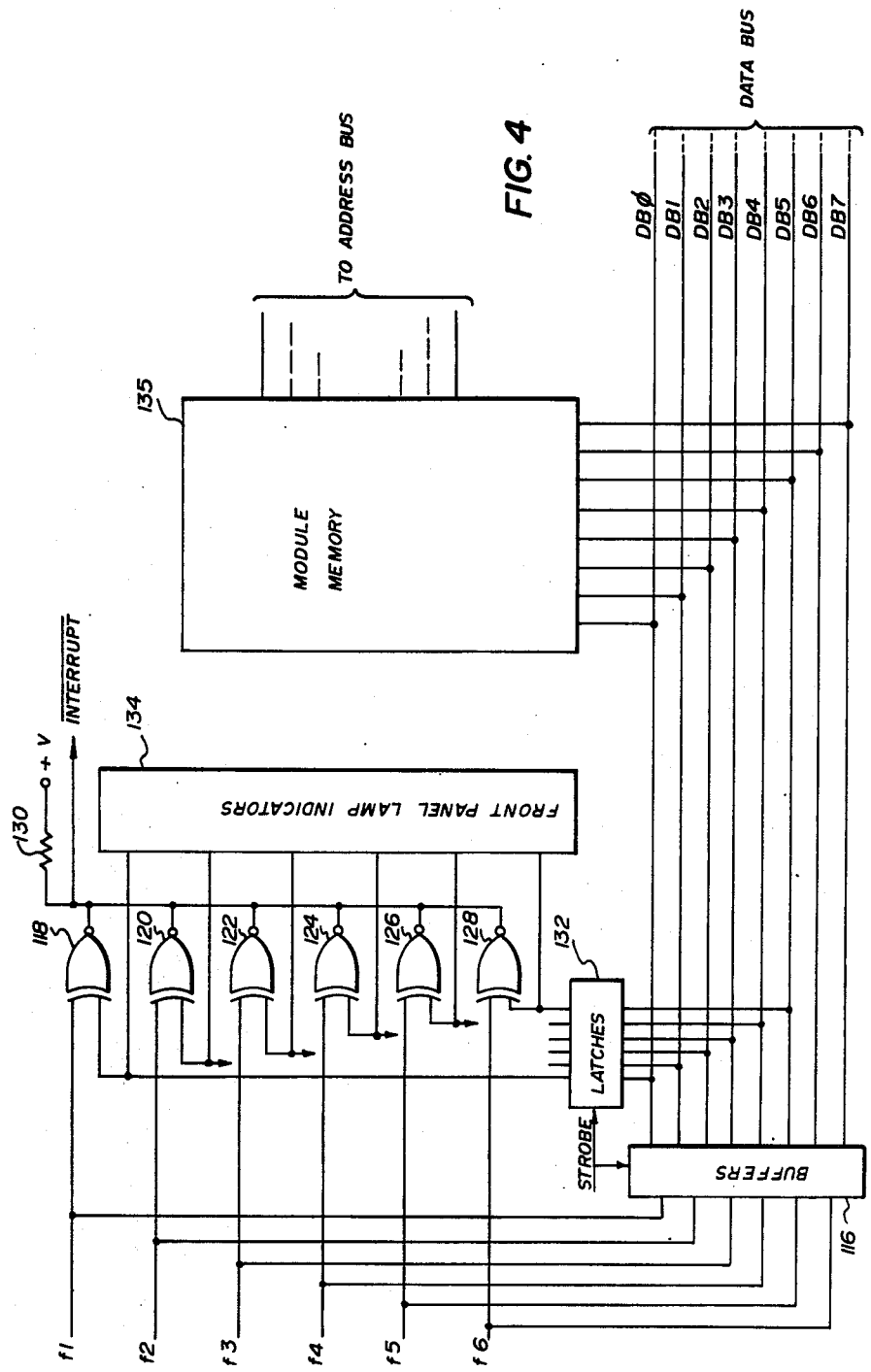

TELEPHONE SIGNALLING TEST SYSTEM

FIELD OF THE INVENTION

The present invention relates to test apparatus in general and particularly to apparatus for monitoring and testing signalling intelligence on telephone circuits.

BACKGROUND AND SUMMARY OF THE INVENTION

Early apparatus for testing telephone circuits were manually operated individual routing test sets capable of testing only isolated parts of the signalling path in out-of-traffic or simulated traffic conditions. An improvement on these manual test devices was subsequent automatic digital test systems which decoded and displayed the progress of test calls and actual traffic.

Due to complexity and diversity of present day telephone systems it is desirable to have testing devices to match. The increasing international direct dial telephone and Telex traffic, for instance, utilizes a variety of signalling formats, dependent on the international boundaries it crosses.

A typical telephone call placed from, say, England to North America may be set up after utilizing signalling schemes such as: dial pulsing, single-tone pulsing, pulsed multifrequency, non-compelled multifrequency (CCITT5) and E&M line signalling.

It is therefore an object of the present invention to provide an integrated signalling test apparatus to monitor diverse signalling conditions particularly during live traffic.

According to the present invention there is provided a signalling test apparatus for monitoring a voice frequency telephone line and the like comprising: interface means for accessing said telephone line in parallel without disturbing its normal operation; a plurality of modules responsive to said interface means for analyzing signalling intelligence including d-c conditions on said telephone line; control and storage means responsive to said plurality of modules for storing and displaying results of signalling analysis performed by said modules.

In a narrower aspect of the present invention, the module for signalling analysis includes a signalling analysis portion and a digital interface portion; the latter including a read-only-memory for storing information identifying said module and defining validity criteria for the signalling intelligence as well as means including signal conversion means for translating the signalling intelligence into a form or mode compatible with said control and storage means.

BRIEF DESCRIPTION OF THE DRAWINGS

A preferred embodiment of the present invention will now be described in conjunction with the accompanying drawings in which:

FIG. 4 is the digital interface portion of a diagram of the R2/MFC module shown in FIG. 1.

DESCRIPTION OF THE PREFERRED EMBODIMENT

Figure 1:
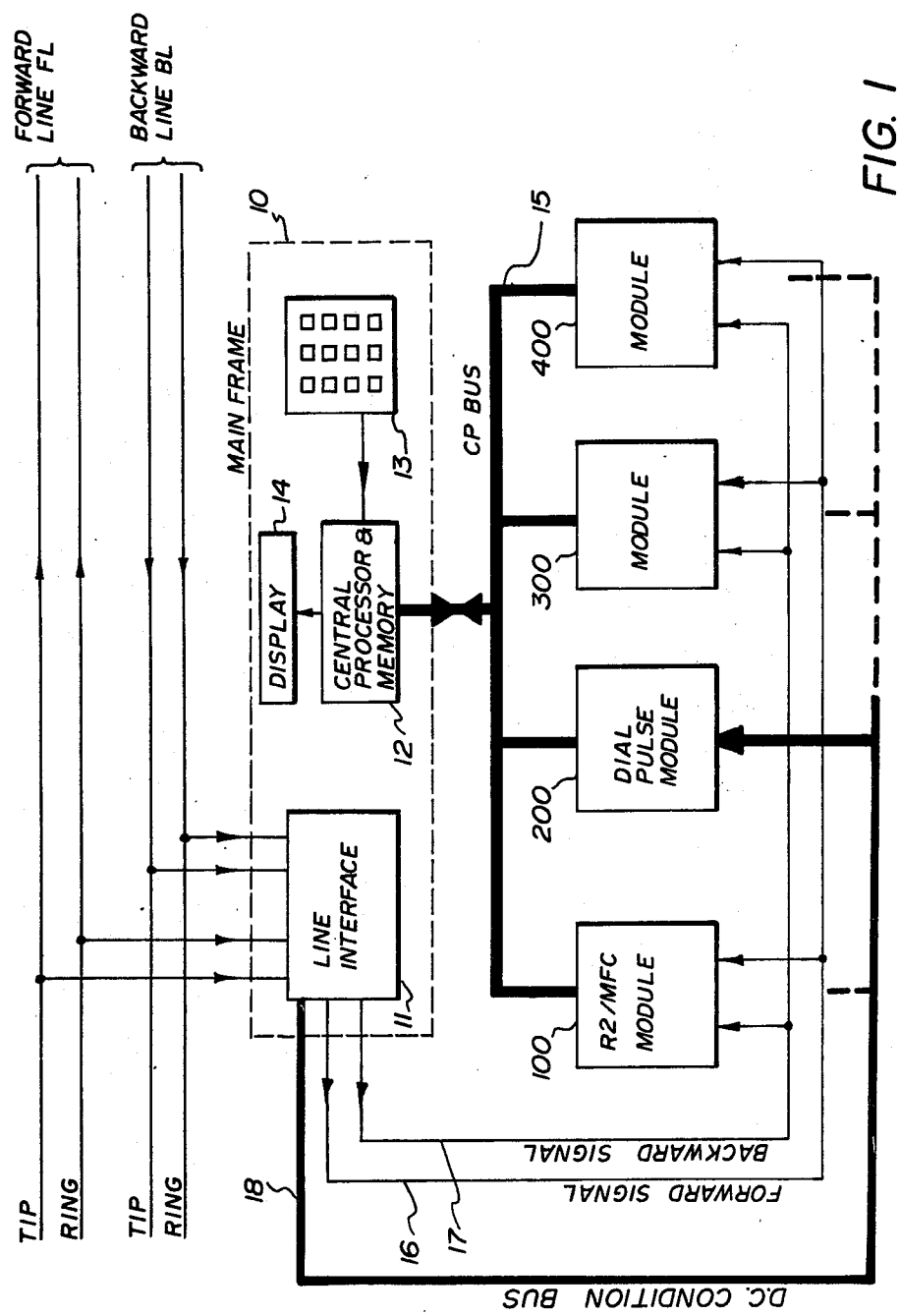
FIG. 1 is a functional block diagram of a signalling test apparatus in accordance with the present invention.

With reference to FIG. 1 of the drawings, the signalling test apparatus comprises a main frame 10 including a line interface 11, a central processor (CP) 12, a data input pad 13 and a numerical display 14. In addition, the central processor 12, acting as a controller of the apparatus, exchanges data with modular components 100, 200, 300 and 400 thereof by means of a CP bus 15. The line interface 11 is bridged across the forward and backward telephone lines FL and Bl, respectively, and supplies the extracted forward and backward signalling intelligence via buses 16 and 17 to the appropriate modular components 100, 300 and 400 of the apparatus. The line interface 11 also supplies the dial pulse module 200, and other modules as necessary, with the d-c conditions (also called supervision and control signals) of the lines FL and BL via d-c condition bus 18. Generally, the d-c condition bus 18 comprises 6 leads, two for the forward line FL, two for the backward line BL and two for the E&M signalling leads if the switching office involved utilizes E&M signalling. The data input pad 13 permits the operator to enter numerical information into the CP 12 for storage therein. The display 14, controlled by the CP 12, is utilized to view captured and stored information from the lines FL and BL. The modular components of the apparatus will vary depending on the environment in which the monitoring is performed. In the present embodiment a multifrequency signalling analysis module will be discussed in detail.

Figure 2:
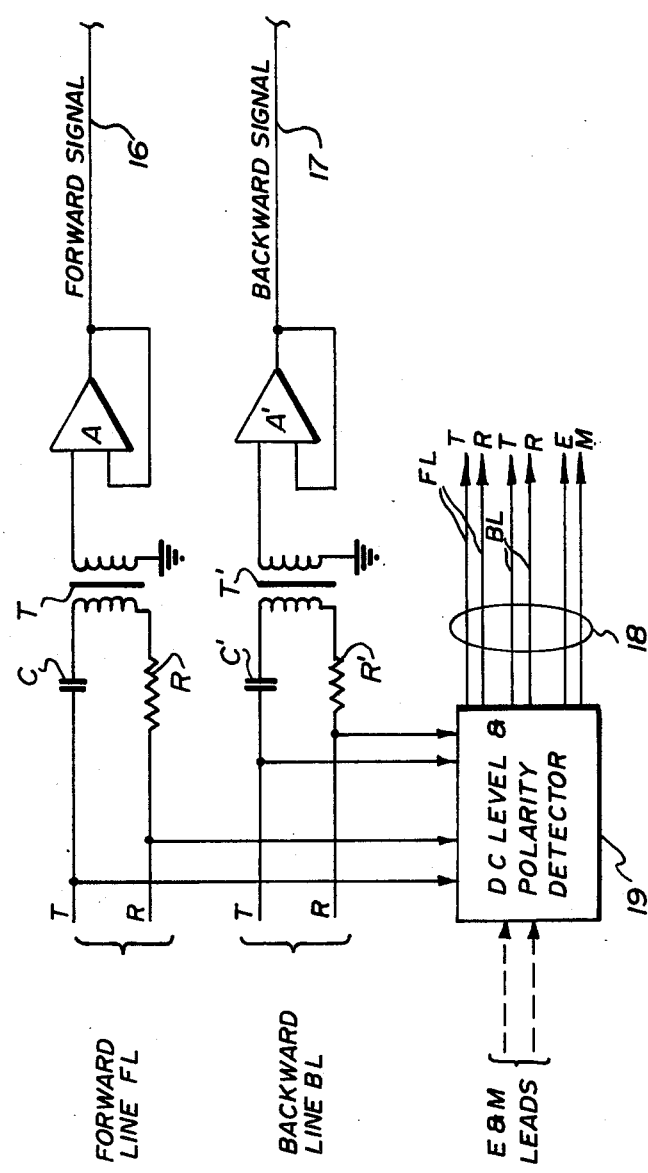
FIG. 2 is a circuit diagram of the line interface shown in FIG. 1.

Turning now to FIG. 2, showing the line interface 11 in more detail, the line FL is tapped in parallel with a high impedance circuit comprising the series connection of a capacitor C, a resistor R and the primary of a 6.45:1 isolation transformer T. The resistor R is sufficiently high so that the line FL remains unaffected in case of a short circuit in or past the transformer T. The secondary of the transformer T feeds a high impedance buffer amplifier A with a gain of unity, the output of which is the forward signal bus 16. The line BL is tapped in the same manner as shown in FIG. 2. In addition, the direct current status of the line FL is sensed by a d-c level and polarity detector 19 and supplied to the dial pulse module 200 via d-c bus 18. The d-c level and polarity detector 19 senses the d-c voltage condition of each lead of the lines FL and BL and also that of E&M signalling leads if existent. The sensing is accomplished simply by high impedance voltage comparators (differential operational amplifiers) which yield at their outputs a logic "zero" or "one" depending on whether the respective lead voltage is above or below a certain threshold. The following three tables summarize the six lead conditions and their interpretation by the module to which they are applied, such as the dial pulse module 200.

TABLE 1

| FORWARD AND BACKWARD LINES | | |
|---|---|---|
| TIP | RING | STATUS OF LINE |
| = V' < −2.5V | = V' < −2.5V | Active |
| > −2.5V | < −2.5V | Idle |
| < −2.5V | > −2.5V | Idle |
| < VRing | < −2.5V | Reversed Polarity |

TABLE 2

| E | STATUS OF LINE |
|---|---|
| At Ground | Active |
| At Battery Or Open | Idle |

TABLE 3

| M | STATUS OF LINE |
|---|---|
| At Battery | Active |
| At Ground Or Open | Idle |

The module 200 may be utilized simultaneously with the module 100 if in addition to multifrequency signalling tests also d-c condition tests are desired, otherwise the dial pulse module would be activated when dial pulse and d-c signalling only are present. In dial pulse analysis and testing, the dynamic changes in the above d-c conditions are registered. Such techniques are known in the art, since dial pulsing is among the oldest signalling schemes in telephony. Additional known circuits may be used in the dial pulse module 200, as will be mentioned later on.

Figure 3:
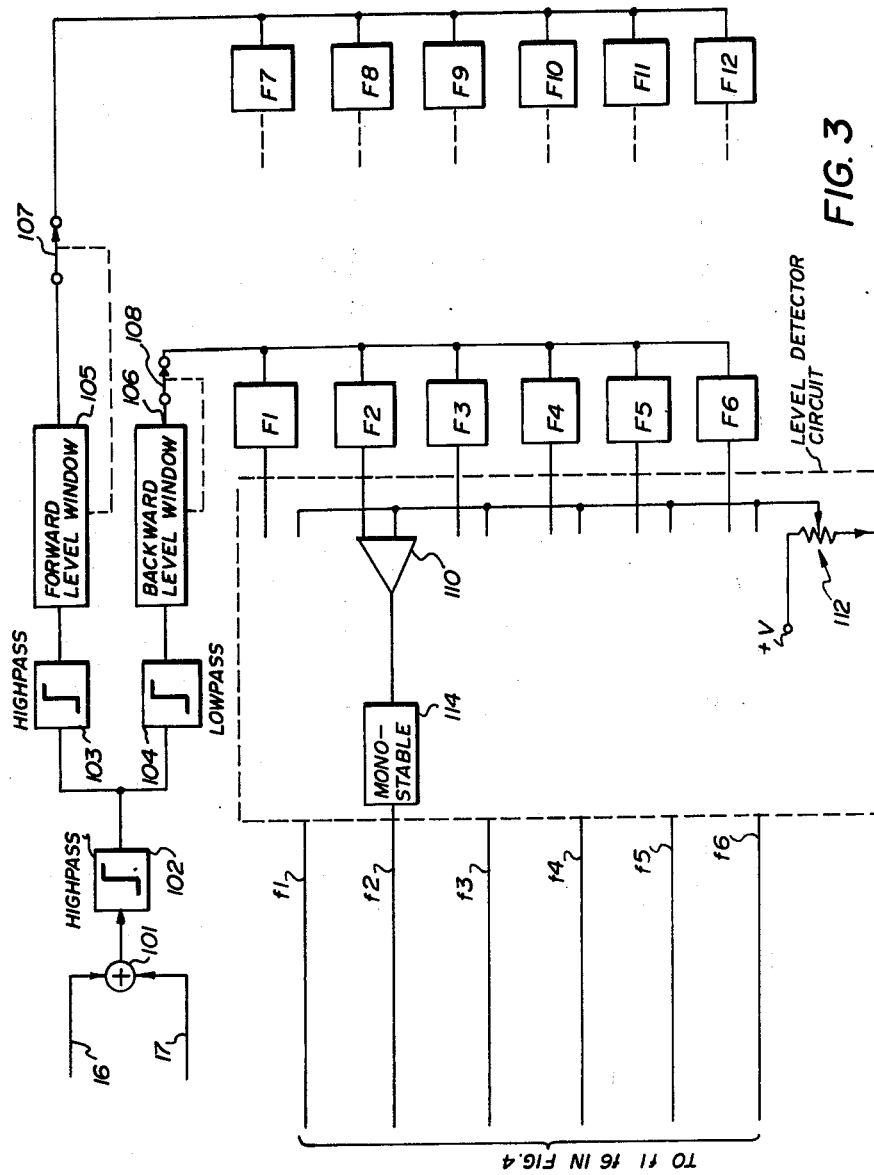
FIG. 3 is the signal analysis portion of a circuit and diagram of the R2/MFC module shown in FIG. 1.

The operation of the apparatus as a whole will be better understood during the following description and discussion of the R2/MFC module 100 detailed in FIGS. 3 and 4 of the drawings. Referring to FIG. 3 the forward and backward signals from the interface 11 (FIG. 1) are relayed to all the modules, and so to the R2/MFC module 100, via buses 16 and 17, and are superposed in summer 101. The reason for such superposition is that a single telephone line may be carrying both forward and backward signalling intelligence, in which case both the buses 16 and 17 would be conveying the forward as well as backward signalling. Also, a forward direction line on one call could be backward on subsequent calls and vice versa. Hence the separation of both directions of signalling is accomplished in the module 100 regardless of whether the telephone circuit monitored is a two or four-wire circuit. From the summer 101 the composite signal is applied to a high pass (HP) filter 102 for low frequency out of band noise elimination. The HP filter 102 has preferably a cut-off frequency $F_c$ of 380 Hz. Since in the R2/MFC signalling format the forward signalling frequencies are (in Hz):

1380, 1500, 1620, 1740, 1860 and 1980;

and the backward signalling frequencies are (in Hz):

540, 660, 780, 900, 1020 and 1140, two filters are used to separate each direction signalling. HP filter 103 is used to extract the forward signalling frequency band from the output of the filter 102, while the backward signalling frequency band is extracted by low pass (LP) filter 104. The cut-off frequency of the filters 103 and 104 is approximately 1260 Hz, intermediate 1140 Hz and 1380 Hz. From here onwards the signal's paths are separate and identical but for the different single frequency filters. In FIG. 3 only the path for the backward signals is shown fully. the following description, however, applies to either path unless otherwise indicated. Even numbers, beginning at 104, are used to denote components in that signal path.

The backward signalling frequency band is applied from the LP filter 104 to a backward level window selection circuit 106. The function of the level window circuit 106 is to set criteria for accepting the signals to be monitored. Conveniently, these criteria are variable and selectable by the operator by means of front panel minimum level and/or window selection means. A suitable circuit for such level window circuit is disclosed in a copending patent application Ser. No. 906,915 entitled: "Level Selective AC Measurement Circuit" filed May 17th, 1978 in the names of Rober E. Sawyer and Robert T. Donahue as inventors and assigned to the same assignee as the present application. If the signal is indicated to be in range according to the set criteria, the level window circuit 106 enables a switch 108 to pass the signals (after having been brought to a standard level via an internal automatic gain control or scaling circuit) for further analysis by the remainder of the module circuitry.

If the signals meet the selected criteria, the switch 108 is closed and the signals pass on to filters F1 to F6. Any signalling tones falling in the passbands of any of the filters appear at the respective filter output. The output of each of the filters F1 to F6 drives a level detection circuit comprising a comparator 110, the other input of which is connected to a common threshold adjuster 112 which is simply a voltage potentiometer. When the threshold is exceeded by the signal at the non-inverting input of the comparator 110 the output of same changes state and monostable multivibrator 114, triggered from the output of the comparator 110, goes into its quasi-stable state at its output for a duration determined by its time constant. The time constant (usually determined by a simple RC network) of the monostable multivibrator 110 is chosen to be slightly longer than the longest period of any signalling tone, so that the monostable multivibrator 114 stays in its quasi-stable state by being retriggered periodically as long as the incoming signalling tone exceeds the set threshold. In FIG. 3 only one level detection circuit (that associated with the filter F2) is shown; the remaining circuits are similar.

The output f2 of the monostable multivibrator 114, as well as the other outputs f1 and f3 to f6, drive strobed buffers 116 as well as a plurality of exclusive NOR-gates 118 to 128 in FIG. 4 of the drawings. The buffers 116 relay the status of each of the outputs f1 to f6 onto data buses DB$\phi$ to DB5, respectively upon occurrence of a strobe pulse originated by the CP12 upon occurrence of an interrupt pulse. This interrupt pulse occurs at the output denoted $\overline{\text{INTERRUPT}}$ in FIG. 4 which is an output of a status change circuit comprising the NOR-gates 118 to 128 and a pull-up resistor 130 connected between all outputs of the exclusive NOR-gates 118 to 128 and a voltage source +V. A status change is indicated by the $\overline{\text{INTERRUPT}}$ output if any of the outputs f1 to f6 outputs changes status. This occurs because strobed latches 132 (FIG. 4), which store the previous status of the outputs f1 to f6 via data buses DB$\phi$ to DB5, drive the second input of each of the NOR-gates 118 to 128. As soon as any of the outputs f1 to f6 changes state, the respective exclusive NOR-gate changes its output status from high to low causing an interrupt pulse to be emitted at the $\overline{\text{INTERRUPT}}$ output. This finally leads to an updating of the information in the latches 132 when the buffers 116 read the new status of the outputs f1 to f6 onto the data buses DB$\phi$ to DB5 respectively.

As may be seen from FIG. 4, the outputs of the latches 132 also drive front panel lamp indicators 134 to indicate the presence of the last signalling tones detected.

While the analysis of the signalling tones is performed in the R2/MFC module, the results of this analysis are relayed to the CP12 by means of the data buses DB$\phi$ to DB5. In the CP12 the signalling tones (now d-c pulses) are assessed as to whether they have proper duration and whether only permissible frequency combinations exist. As is well known in the art, the R2/MFC signalling schemes permit only two out of six frequencies simultaneously. If more or less than two frequencies exist simultaneously, the CP12 would register an error. Clearly, such functions could be performed by a controller utilizing special purpose logic, instead of a microprocessor such as the Intel 8080. The latter approach however, adds more flexibility at little or no additional cost. Ultimately, this is a designer's choice.

The R2/MFC module 100, as does every other module, has its own read-only-memory (ROM) 135 in addition to whatever memory storage is necessary for operation of the CP12. In the module memory 135 is stored all the information identifying the R2/MFC module 100, as well as the criteria peculiar to the signals analysed by that module, such as acceptable tone durations and combinations, identifying frequency pairs with their corresponding digits, and so forth. Such information, upon identification of the module 100 as an R2/MFC type module, is requested via the address bus and retrieved via the data buses DB$\phi$ to DB7.

Due to the fact that each module has its own memory in addition to the memory of the CP12, it is opportune to organize the callable memory addresses sequentially. That is, the main frame CP12 memory starts at 0000 (in Hexadecimal notation) location address and, say, extends to location address 14FF. The next block of addresses may be assigned to the module 100, and so on. Thus, the unit has capability for accommodating future modules, which would have address blocks beyond the latest module. The limit of addresses is reached when location address FFFF (in Hexadecimal notation) has been reached, corresponding to 65535 locations. This is considered sufficient for the purposes of the present apparatus.

The data input pad 13 is simply a sixteen button Digitone pad used in many telephone sets. It serves to input telephone signalling digits which are converted into storable information for storage in the memory of the CP12. The latter would then be able to capture signalling information identical to the number entered for later display and verification by the operator. This mode of operation also allows recognition and capture of, say, all numbers preceded by any given destination code. The destination code is first entered followed by a symbol such as *. Programming the Intel 8080 to perform as required by the designer is taught in "Intel 8080 Assembly Language Programming Manual" published 1974, 1975 and 1976 and available from: Intel Corporation, 3065 Bowers Avenue, Santa Clara, Calif., 95051.

In the module 200 for dial pulse analysis, such functions are analysed as pulse duration and possibly percent break. The module 200 may be organized along the same line as the module 100, with a signal analysis portion (corresponding to FIG. 3), and a digital interface portion (corresponding to FIG. 4). Indeed, the digital interface portion would be identical to that shown in FIG. 4, but for a simpler status change indicator and associated circuitry. As to the analysis of dial pulse signalling, there is a variety of circuit techniques to choose from. For instance, U.S. Pat. No. 3,603,746 entitled: "Measurement Of Average Duty Cycle" issued to Robert B. Heick et al on Sept. 7, 1971, discloses a percent break measuring technique suitable for utilization in the dial pulse analysis module 200.

What is claimed is:

1. Signalling test apparatus for monitoring a voice frequency telephone line and the like comprising:
    (a) interface means for accessing said telephone line in parallel without disrupting its normal operation;
    (b) a plurality of modules responsive to said interface means for analyzing signalling intelligence including d-c conditions on said telephone line;
    (c) control and storage means responsive to said plurality of modules for storing and displaying results of signalling analysis performed by said modules;
    (d) display means for displaying numerical data stored in said second and storage means; and
    (e) data input means for entering data into said control and storage means, whereby signalling analysis results identical to entered data are captured and stored for later display.

2. The apparatus of claim 1, said plurality of modules for signalling analysis further comprising storage means for storing:
    (i) information identifying said module;
    (ii) information defining validity criteria for said signalling intelligence; and
    (iii) information for translating said signalling intelligence into a form compatible with said control and storage means.

3. The apparatus of claim 2, a first of said plurality of modules further comprising minimum signalling level detection means.

4. The apparatus of claim 3, said interface means comprising a high impedance line bridging circuit including an isolation transformer followed by a buffer amplifier.

5. The apparatus of claim 4, said control and storage means including a central processing microcomputer.

6. The apparatus of claim 5, said first module further comprising status change indicating means for indicating a change in latest signalling intelligence analyzed.

7. The apparatus of claim 6, said first module further comprising two substantially similar signalling analysis paths, one for forward signalling and the other for backward signalling.

8. The apparatus of claim 7, each of said two signalling analysis paths comprising:
    (i) a band selection filter;
    (ii) level range selection means; and
    (iii) a plurality of single tone selection filters followed by said level detection means.

9. The apparatus of claim 8, said level detection means followed by said status change indicating means.

10. Signalling test apparatus for monitoring a voice frequency input signal on a telephone line, comprising
    line interface means coupled across said telephone line for accessing said line without disrupting its normal operation;
    a plurality of modules for analyzing the input signal on said telephone line, at least one of said modules including
      a level window selection circuit coupled to said line interface means for transmitting a selected signal corresponding to said input signal only when said input signal is in accordance with a predetermined criteria, said selected signal having a plurality of frequency components;

a plurality of filters coupled to the output of said level window selection circuit, each of said filters producing at its output a signal having a predetermined one of said frequency components;

signal conversion means for converting each of the outputs of said filters to a d-c pulse signal, and a module memory coupled to the output of said signal conversion means for storing information identifying said module and criteria for acceptability of said input signal, a central processor coupled to the output of said signal conversion means and to said module memory, said central processor determining whether the signals at the output of said signal conversion means comply with said criteria for acceptability of said input signal in accordance with information received from said module memory;

data input means coupled to said criteria processor for entering data therein, and display means coupled to said central processor for displaying data stored therein.

11. Signalling test apparatus as defined by claim 10 wherein said line interface means includes a high impedance isolation circuit coupled across said telephone line, a buffer amplifier coupling said isolation circuit to said at least one module, and a d-c level and polarity detector coupled across said telephone line for sensing the d-c voltage condition of said telephone line, said apparatus further comprising a dial pulse module coupled to said d-c level and polarity detector and to said central processor for analyzing dial pulse signalling.

* * * * *